E. J. VON PEIN.
CASH REGISTER.
APPLICATION FILED AUG. 4, 1909.

1,071,788.

Patented Sept. 2, 1913.

3 SHEETS—SHEET 2.

Witnesses
Inventor

E. J. VON PEIN.
CASH REGISTER.
APPLICATION FILED AUG. 4, 1909.
1,071,788.
Patented Sept. 2, 1913.
3 SHEETS—SHEET 3.
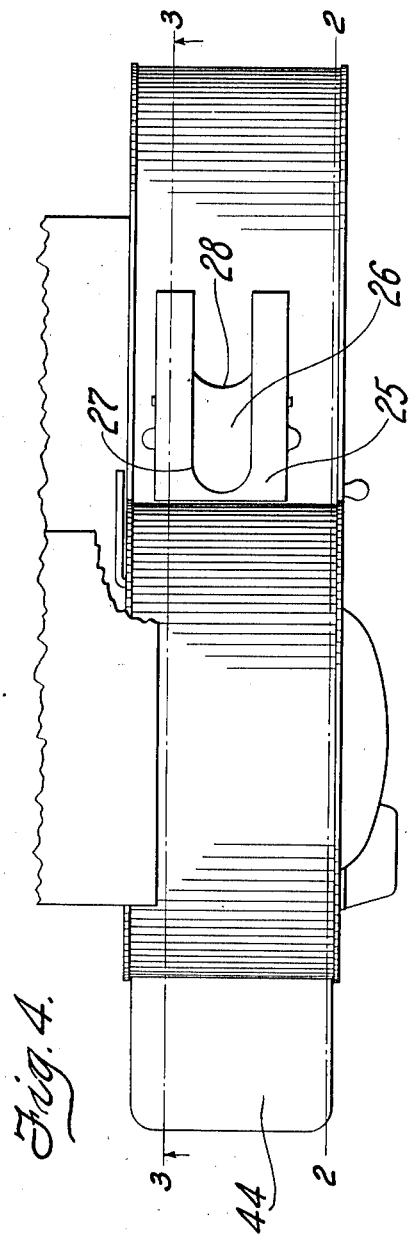
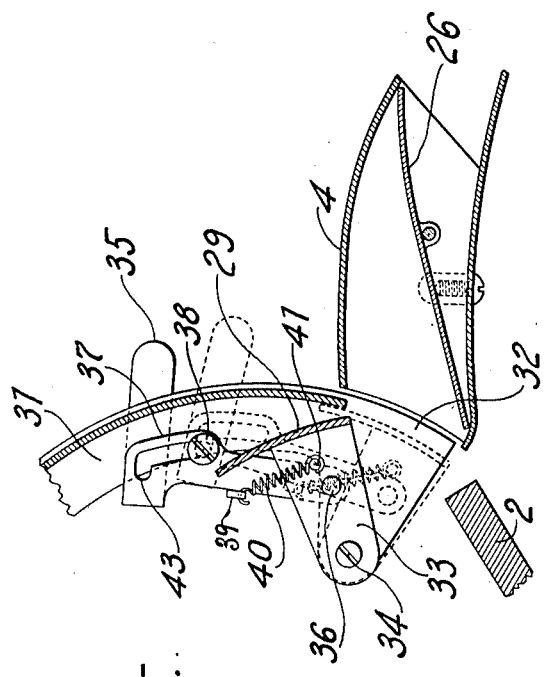

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,071,788.                   Specification of Letters Patent.        Patented Sept. 2, 1913.

Application filed August 4, 1909. Serial No. 511,120.

*To all whom it may concern:*

Be it known that I, EDWARD J. VON PEIN, a citizen of the United States, residing at Dayton, in the county of Montgomery and State of Ohio, have invented certain new and useful Improvements in Cash-Registers, of which I declare the following to be a full, clear, and exact description.

This invention relates to check ejector mechanism for cash registers. Up to the present time check ejectors were constructed to deliver the checks at the front, or, cashier's side of the register.

The present invention comprises means for delivering the check if desired at the rear of the register in a receptacle which is conveniently located for the purpose of mechanically presenting the printed checks to customers. The chute which guides the check from the printing mechanism to the receptacle at the rear of the register is left open so that the moving check will attract the attention of customers to the same. The device is provided with adjustable means to permit the check to be delivered either to the cashier at the front of the register or to the customer at the rear of the register.

A printed cash register check or voucher loses its principal value if the operator of the machine fails to deliver the check to the customer and there is less likelihood of fraud on the part of the operator if printed records of all registrations may be had by the customer. The invention is also applicable and intended for use in cashier systems, where the cashier delivers printed checks to clerks after each entry in the machine, making such manual delivery unnecessary by mechanically performing the same.

With this and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
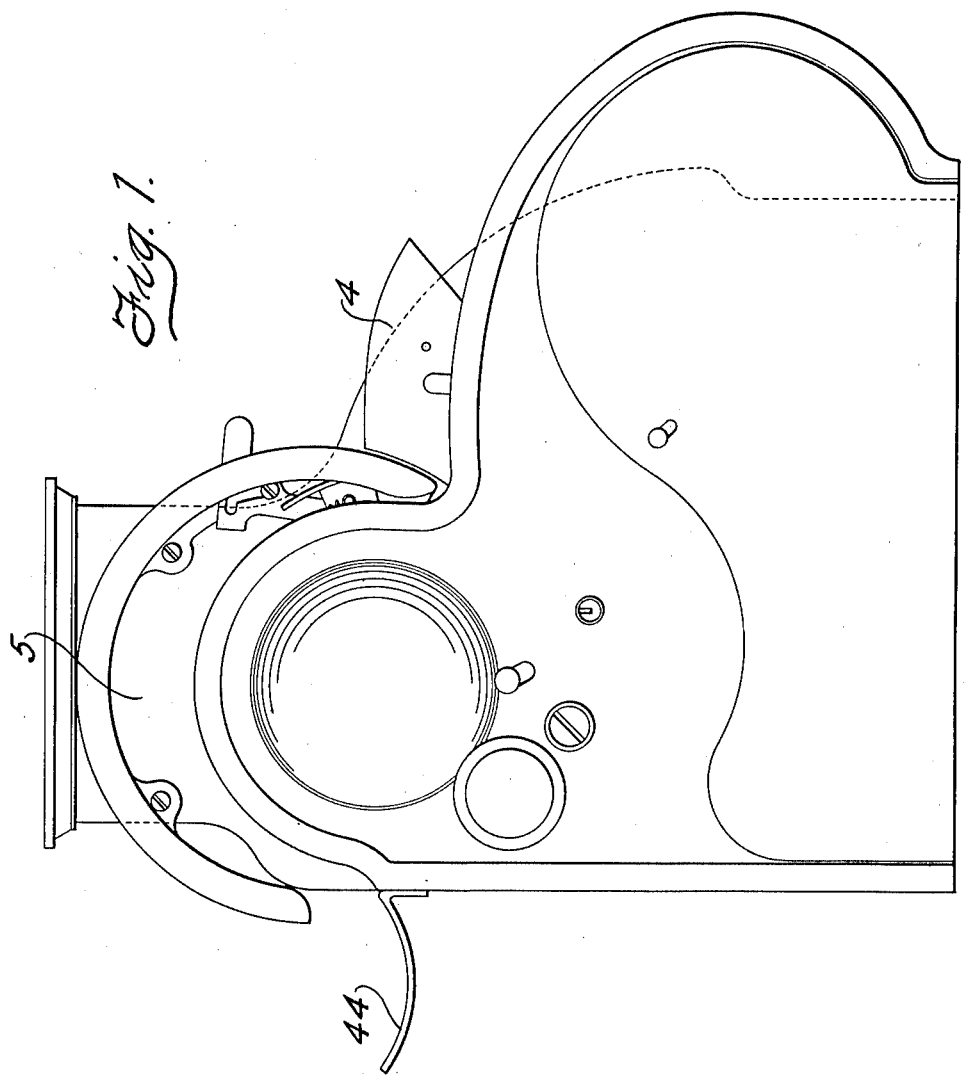
Figure 2:
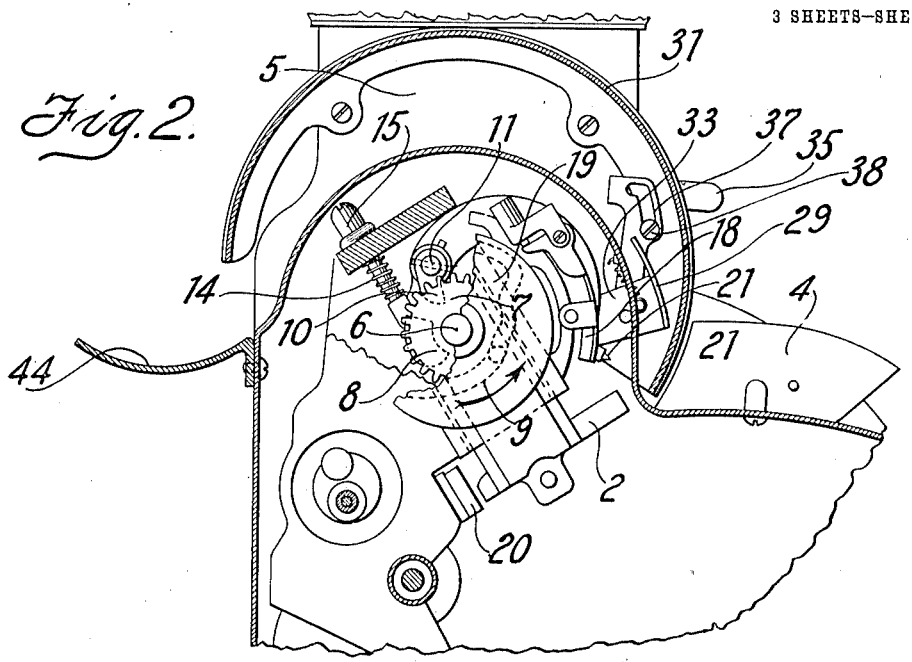
Figure 3:
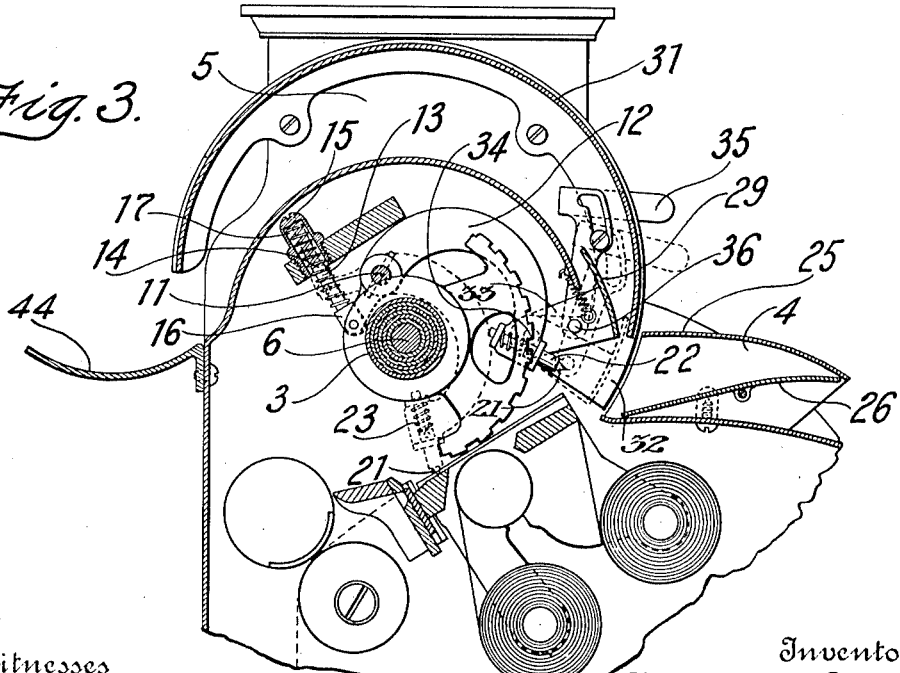

Of said drawings: Figure 1 is a left side elevation of a cash register provided with a check ejector mechanism constructed according to this invention. Fig. 2 is a left side elevation of a cash register printer and check ejector mechanism showing the printer hood and one of the check chutes in section. Fig. 3 is a transverse vertical section taken on the line 3—3 of Fig. 4. Fig. 4 is a top plan view of the check ejector mechanism. Fig. 5 is a detail in side elevation and partly in section of the means for guiding ejected checks either to the front or rear of the register.

The check ejector mechanism and only such parts of the printing mechanism and register as are necessary for the purpose of illustrating the invention are shown in the drawings.

The invention is shown as applied to a register of a well known form now on the market and which includes printing mechanism. The printing part of the machine is fully described in Patent No. 483,511 to Hugo Cook, granted September 27, 1892, and the check ejector is well shown in Patent 580,378 to Cleal and Reinhard, granted April 13, 1897. Reference to these patents may be made for a further description.

Referring to these drawings, (Fig. 3), 1 indicates the strip of check paper at rest upon the platen 2 in position for being printed upon and cut, and in position so that the cut portion of the check may be ejected from the machine. For the purpose of not complicating the drawings, the type carriers are omitted, but these carriers are mounted upon the concentric tubes 3 which may be differently rotated by the operating mechanism of the register for the purpose of bringing different combinations of type into the printing line opposite the platen 2. The printed check is either delivered to the front of the register through the chute 4, or to the rear of the register through the chute 5.

The shaft 6, Fig. 2, is caused to make one rotation upon each operation of the machine. The means for rotating the shaft 6 are described in the before mentioned patent to Cook. This shaft carries a gear 7 which is provided with a lug 8 which, upon the rotation of the shaft in the direction indicated by the arrow 9 engages a short arm 10 which is rigidly secured to a shaft 11 which also carries the check ejector 12. The check ejector extends rearwardly from shaft 11 and at its rear end has pivoted thereto a spring carrying rod 13. The compression spring 14 is coiled around the rod 13 and is compressed between a nut 15 and a shoulder 16 of the rod. The nut 15 is suitably recessed at 17 for the reception of the spring and to permit the rod 13 to move upwardly into the recess at the time the lug 8 of the gear 7 engages the arm 10, at which time the check ejector is rocked from the position in which it is shown in full lines, Fig. 3, to the position in which it is indicated by the broken lines.

Upon the operation of the machine, before the lug 8 engages the arm 10, the oscillatory ink pad 18 is brought between the type carriers and the platen 2. The platen 2 is then moved upwardly a slight distance in order to press the ink pad 18 against the type and thereby ink the same. The platen is then lowered a sufficient amount to permit the withdrawal of the ink pad from the type carriers and the platen after which the platen is moved its full extent upwardly causing an impression to be made upon the strip of check paper 1. The cam by means of which the platen 2 is operated is indicated at 19, Fig. 2. This cam, together with the means for carrying the ink pad into and out of operative position, is described in the patent to Cook before mentioned.

The knife which severs the printed check from the remainder of the strip is carried by the platen 2 and is slidable within the guide 20. At the time the impression is taken the knife cuts the strip and the upward movement of the platen forces the check against a serrated edge 21 of the check ejector, carried by a small plunger 22 which is resiliently mounted at the end of the check ejector. The spring 23 is of requisite strength to cause the serrated edge 21 to penetrate the check upon the rise of the platen just enough so that the check will be carried upwardly when the check ejector springs upwardly, but will fly free of the check ejector when the ejector arrives at its upward or normal position. Upon the return of the platen to its lower position when the platen has been lowered far enough to clear the arc of movement of the check ejector, the lug 8, Fig. 2, clears the nose of the arm 10 and permits the check ejector to swing forwardly under the action of the spring 14. The check is carried with the ejector, and normally the front edge of the check strikes the underside of the plate 25 of the chute 4 and is guided outwardly by the plate 25, coming to rest between the plate 25 and the plate 26 which is pivoted within the chute 4. The plates 25 and 26 are respectively cut away at 27 and 28 for the purpose of permitting the forward end of the check to be grasped so that the check may be easily withdrawn from the chute 4.

With this brief statement of the previous machine the novel features may be described.

If it is desired to cause the checks to be delivered at the customer's side of the register through the chute 5 instead of through the chute 4, a curved plate or guard 29 is rocked downwardly so that it will form a continuation of the guide 31 of the chute 5 thus closing the opening 32 which leads into the chute 4. The guard 29 is carried upon an arm 33 which is pivoted at 34 to an extension of the guide 31. An operating handle 35, Fig. 5, is pivoted to the arm 33 at 36. It is provided with a slot 37 through which extends a screw 38 secured to the guide 31. The handle 35 is provided with a lug at 39 to which is attached a spring 40, the other end of the spring being attached to a pin 41 on the arm 33, but forward of the pivot 36. Therefore by moving the handle 35 downward in a substantially vertical plane and thereby rocking the arm 33 downward, the spring 40 will be extended and tend to return both the arm 33 and the handle 35 to their upper positions. In order to retain the handle 35 in its lower position the slot 37 is offset at 43 so that the handle may be rocked slightly forward when the offset is opposite the screw 38 and retained in such position. When the guard 29 closes the opening 32 in the chute 4, the forward ends of the checks when ejected will engage the guard and by it be guided upwardly through the chute 5 instead of the chute 4. The checks are ejected with sufficient force to bring the check into the receptacle 44.

It is believed that the operation of the device will be understood from the foregoing description.

As shown in said Cook patent the roll of check paper is stored over the bottom of the machine, and passes to the printing mechanism over a roller shown in Fig. 3.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a machine of the class described, the combination with two check chutes having adjacent ends, one of said chutes having an open side for the purpose set forth, of an ejector for moving the checks, and an element movable to cause checks to pass into either chute.

2. In a machine of the class described, the combination with two check chutes extending toward opposite sides of the machine, one of said chutes having an open side for the purpose set forth, of an ejector for moving the checks, and an element movable to direct checks into either chute as desired.

3. In a machine of the class described, the combination with two check chutes extending in different directions, one of said chutes having an open side for the purpose set forth, of an ejector for moving the checks, and a plate movable manually to direct checks into either chute.

4. In a machine of the class described, the combination with two check chutes extending in different directions but having adjacent ends, one of said chutes having an open side for the purpose set forth, of a plate positioned near said adjacent ends and movable to direct checks into either chute.

5. In a machine of the class described, the combination with two check chutes extending in different directions but having adjacent ends, one of said chutes having an open side for the purpose set forth, of a plate positioned near said adjacent ends and normally permitting checks to enter one of the chutes, but movable to direct checks into the other chute.

6. In a machine of the class described, the combination with two check chutes extending in different directions but having adjacent ends, one of said chutes having an open side for the purpose set forth, of a pivoted plate positioned near said adjacent ends, and a manually operable element connected to said plate.

7. In a cash register, the combination with printing mechanism, of an open-sided chute, and means for throwing checks from the printing mechanism through said open-sided chute.

8. In a cash register, the combination with printing mechanism, of an open-sided chute leading from one side to the other of the register, and means for throwing checks from the printing mechanism through said open-sided chute.

9. In a cash register, the combination with printing mechanism, of a check delivering chute, said chute arranged that checks may be viewed while passing through the same, and a device for throwing checks through the chute.

10. In a cash register, the combination with printing mechanism, of a check delivering chute leading from front to rear of the cash register, and a device for moving checks through the chute.

11. In a cash register, the combination with printing mechanism, of a check delivering chute leading from front to rear of the cash register arranged that checks may be viewed while passing through the same, and a device for moving checks through the chute.

12. In a machine of the class described, the combination of a check supply roll; mechanism for printing and severing checks therefrom; a plurality of check chutes having adjacent ends; an element movable to cause checks to pass into either chute; and an ejector for moving the checks through the selected chute.

13. In a machine of the class described, the combination of a check supply roll; mechanism for printing and severing checks therefrom; a plurality of check chutes extending toward opposite sides of the machine from the printing and severing mechanism; an element movable to direct checks into either chute as desired; and an ejector for moving the checks from the printing and severing mechanism through the selected chute.

14. In a machine of the class described, the combination of a check supply roll; mechanism for printing and severing checks therefrom; a plurality of check chutes extending in different directions; a plate movable manually to direct checks into either chute; and an ejector for moving the checks through the selected chute.

15. In a machine of the class described, the combination of a check supply roll; mechanism for printing and severing checks therefrom; a plurality of check chutes extending in different directions but having adjacent ends adjacent the printing and severing mechanism; and a plate positioned near said adjacent ends and the printing and severing mechanism and movable to direct checks into either chute.

16. In a machine of the class described, the combination of a check supply roll; mechanism for printing and severing checks therefrom; a plurality of check chutes extending in different directions having adjacent ends adjacent the printing and severing mechanism; and a plate positioned near said adjacent ends and normally permitting checks to enter one of the chutes but movable to direct checks into the other chute.

17. In a machine of the class described, the combination of a check supply roll; mechanism for printing and severing checks therefrom; a plurality of chutes having adjacent ends but extending in opposite directions the adjacent ends being also adjacent the printing and severing mechanism; a pivoted plate positioned near said adjacent ends; and a manually operable element connected to said plate.

18. In a machine of the class described, the combination of a check supply roll; mechanism for printing and severing checks therefrom; means for feeding the supply roll to the printing and severing mechanism; a plurality of diverging check chutes having their adjacent ends adjacent the printing and severing mechanism; and an ejector for positively forcing the severed check from the printing and severing mechanism through either of the check chutes.

19. In a machine of the class described, the combination of a check supply roll; means for severing checks therefrom; a plurality of check chutes leading to different parts of the machine; means for causing the checks to pass into either chute; and means for moving the checks through the selected chute.

In testimony whereof I affix my signature in the presence of two witnesses.

EDWARD J. VON PEIN.

Witnesses:
F. E. HAMILTON,
R. RUMMLER.